United States Patent [19]
Watkinson

[11] Patent Number: 5,001,415
[45] Date of Patent: Mar. 19, 1991

[54] ELECTRICAL POWER APPARATUS FOR CONTROLLING THE SUPPLY OF ELECTRICAL POWER FROM AN ARRAY OF PHOTOVOLTAIC CELLS TO AN ELECTRICAL HEAD

[76] Inventor: Stuart M. Watkinson, 8 Deborah St., Clontarf, Qld. 4019, Australia

[21] Appl. No.: 368,301
[22] PCT Filed: Dec. 18, 1987
[86] PCT No.: PCT/AU87/00430
§ 371 Date: Jun. 15, 1989
§ 102(e) Date: Jun. 15, 1989
[87] PCT Pub. No.: WO88/04801
PCT Pub. Date: Jun. 30, 1988

[30] Foreign Application Priority Data
Dec. 19, 1986 [AU] Australia .................. PH 8573

[51] Int. Cl.[5] .................................. H01L 31/00
[52] U.S. Cl. ........................... 323/906; 136/293
[58] Field of Search ................ 136/293; 323/906

[56] References Cited
U.S. PATENT DOCUMENTS

| | | | |
|---|---|---|---|
| 3,696,286 | 10/1972 | Ule ............................ | 323/906 |
| 4,333,136 | 6/1982 | Baker ......................... | 136/293 |
| 4,375,662 | 3/1983 | Baker ......................... | 323/906 |
| 4,468,569 | 8/1984 | Norris ........................ | 323/906 |
| 4,494,801 | 1/1985 | Streater et al. ............ | 323/906 |
| 4,510,434 | 4/1985 | Assbeck et al. ........... | 323/906 |
| 4,544,876 | 10/1985 | Bailey et al. .............. | 323/906 |
| 4,580,090 | 3/1986 | Bailey et al. .............. | 323/906 |
| 4,604,567 | 8/1986 | Chetty ....................... | 136/293 |
| 4,614,879 | 9/1986 | Ault ........................... | 136/293 |
| 4,695,785 | 9/1987 | Mieth et al. ............... | 323/906 |
| 4,728,878 | 3/1988 | Anthony .................... | 136/293 |

FOREIGN PATENT DOCUMENTS

| | | | |
|---|---|---|---|
| 2076 | 8/1985 | Japan ......................... | 136/293 |
| 249682 | 12/1985 | Japan . | |
| 52719 | 3/1986 | Japan . | |
| 80315 | 4/1986 | Japan . | |
| 15617 | 1/1987 | Japan . | |
| 93719 | 4/1987 | Japan . | |
| 2111691 | 7/1983 | United Kingdom . | |
| 3121 | 1/1987 | World Int. Prop. O. . | |

Primary Examiner—Steven L. Stephan
Assistant Examiner—Jeffrey Sterrett
Attorney, Agent, or Firm—Edwin D. Schindler

[57] ABSTRACT

Electrical power transfer apparatus (40) for controlling the supply of electrical power fram an array of photovoltaic cells (41) to an electrical load (46) by means of a switching power converter (45). The switching power converter (45) is controlled by a regulator (58) to maintain the output voltage from the photovoltaic array (41) at a fixed fraction of the open circuit voltage of the photovoltaic array (41), the fixed fraction suitably being between 0.75 and 0.8, whereby the power transfer from the photovoltaic array (41) is maximized. The open circuit voltage of the photovoltaic array (41) is sensed by inhibiting the operation of the switching power converter for short sampling periods at regular intervals, and allowing a capacitor (52) to charge to the voltage of the open-circuited photovoltaic array (41) during the sampling periods.

8 Claims, 2 Drawing Sheets

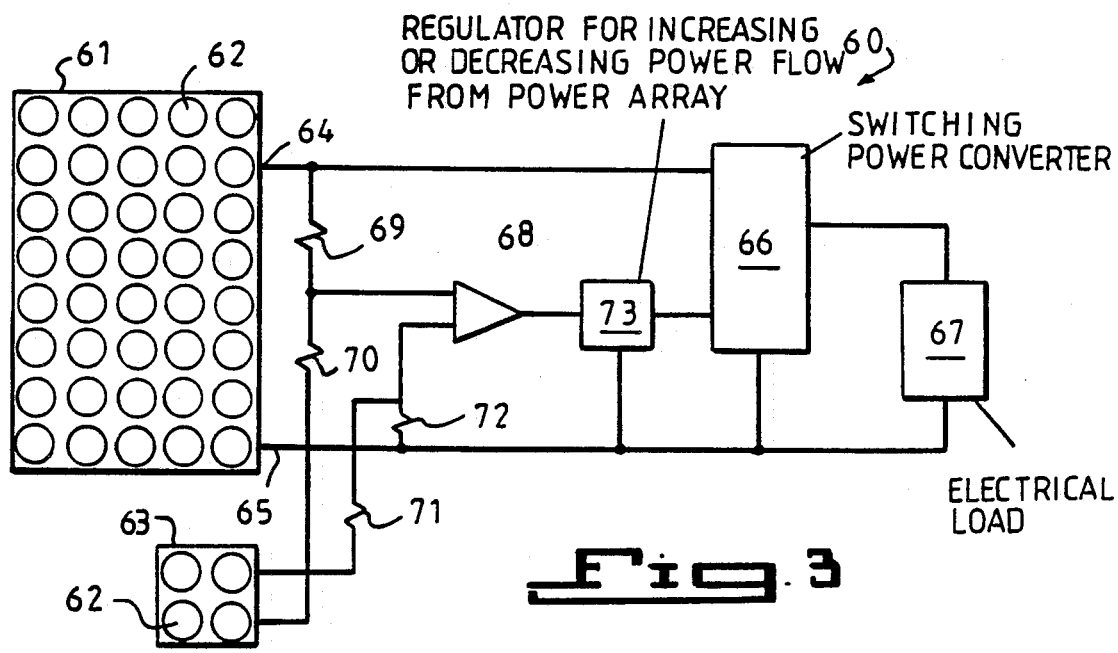
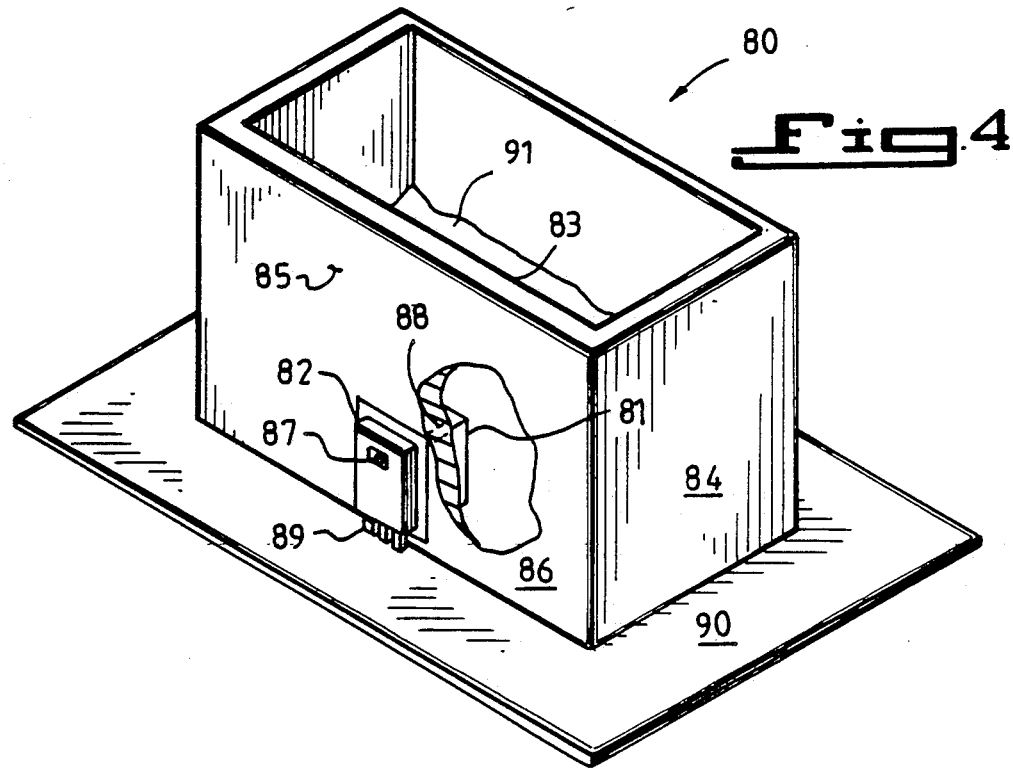

ELECTRICAL POWER APPARATUS FOR CONTROLLING THE SUPPLY OF ELECTRICAL POWER FROM AN ARRAY OF PHOTOVOLTAIC CELLS TO AN ELECTRICAL HEAD

BACKGROUND OF THE INVENTION

This invention relates to electrical power transfer apparatus.

This invention has particular but not exclusive application to the transfer of electrical power from photovoltaic cells to electrical loads or energy storage devices, and for illustrative purposes reference will be made to such application. However, it is to be understood that this invention could be used in other electrical power generation applications in which is exhibited a predictable relationship between output power and a measurable operating characteristic, such as in thermoelectric converters.

Electrical power sources such as photovoltaic cells have a potential power output which varies widely according to the intensity of light to which they are exposed. In addition, for a given level of light intensity (insolation) such cells have a characteristic power output curve which relates the actual output power of a cell or array of cells to the resistance of the electrical load applied to them.

Photovoltaic cells individually have a relatively low power output, and are usually used in arrays of cells electrically connected in series, parallel, or series-parallel configurations. For the purposes of this specification, an array is to be taken to mean any number of cells connected in any useful configuration.

When the load resistance is infinite, the current is zero, and the power output, which is the product of voltage and current, is also zero. The voltage of a cell at this operating point is called the open circuit voltage. When the load resistance falls to zero, the short circuit current flows and the output voltage falls to zero. The power output at this point must consequently be zero as well.

For load resistances between infinity and zero, the product of the output voltage and the output current gives a measure of the output power of a photovoltaic cell. The voltage, current and power output as a function of the load resistance may be plotted for a particular cell. The plot is characteristically a smooth curve with a maximum output at a certain value of load resistance. A family of such curves may be plotted, each showing the cell characteristics at a certain value of insolation. For each curve, the power output peak occurs at a different value of load resistance.

In most applications, such as producing electric power from solar radiation, the insolation varies continually, as the sun rises and falls in the sky during the day, and as a result of changing cloud cover. The highest energy output over a period of time from a photovoltaic cell or an array of cells operating under conditions of varying insolation will be achieved if the resistance of the load applied to the cell is adjusted continually to ensure that the values of load resistance, voltage and current which lead to the highest output power at a particular value of insolation are always attained.

A further problem with photovoltaic cells is that the voltage at which they produce maximum power may bear no relationship to the voltage level required for certain applications such as battery charging or operating appliances where a fixed output voltage is necessary. This problem may be overcome by utilising a switching power converter. This is an electronic device which converts available input power to different voltage and current levels. Conventional switching power converters used with photovoltaic cells are unable to maximise the power delivery at any time, as they are unable to change their operating parameters to ensure that the photovoltaic cells operate at their maximum power point.

DESCRIPTION OF THE PRIOR ART

Power converters are known in which control is exercised by classical adaptive control theory. Convertor controllers of this type constantly perturb the set point and measure the effect of the perturbation on a selected output or input parameter. If an improvement is achieved, the controller moves the set point until perturbations of the control parameter in either direction produce a deterioration in the selected parameter. Such controllers are very complex in design and manufacture and have limited accuracy over wide dynamic ranges, and are consequently not suited to the control of power from typical photovoltaic installations.

A further problem with the design of power converters is that the switching semiconductors which switch the input current dissipate heat, and this heat must be conducted away from the semiconductors in order to maintain them at an acceptable operating temperature. Many methods of mounting switching semiconductors are in use. However, most methods require significant manual skill and complex installation procedures.

Active switching semiconductors are normally associated with passive switching semiconductors such as "freewheeling" diodes in typical converter designs. The inductance of the electrical conduction path between switching semiconductors and associated passive switching semiconductors must be minimised if the converter is to operate reliably and efficiently. Conventional mounting techniques frequently result in higher inductance levels than are desirable.

SUMMARY OF THE PRESENT INVENTION

The present invention aims to alleviate the above disadvantages and to provide power transfer apparatus which will be reliable and efficient in use. Other objects and advantages of this invention will hereinafter become apparent.

With the foregoing and other objects in view, this invention in one aspect resides broadly in power transfer control apparatus for controlling the supply of electrical power from a photovoltaic array to a load, said control apparatus including: a monitoring device for monitoring an operating characteristic of said array; a comparator connectible to said array and said monitoring device; and regulation means associated with said comparator for regulating the power transferred from said array.

Preferably, the regulating means regulates the power transferred from the photovoltaic array by controlling a switching power converter, although of course other controlling means may be used if desired, such as controlling the resistance of the load applied to the photovoltaic array.

Preferably, the monitoring device provides an indication of the open circuit voltage of the array by measuring the output voltage of the photovoltaic array while the output current is interrupted or reduced to zero, such as by inhibiting the operation of the switching power converter. Of course, if desired, other forms of providing an indication of the open circuit voltage of the photovoltaic array, such as measuring the open circuit voltage of an independent photovoltaic array, may be used.

The photovoltaic array output current may be interrupted for short sampling periods at random intervals. Preferably, however, the output current from the photovoltaic array is set to zero for regular sampling periods at regular intervals, and the sampling periods are made short relative to the intervals, whereby loss of output energy due to the interruption of power is minimised. Suitably, the current is interrupted for a sampling period of 50 milliseconds at intervals of ten seconds, but any combination of sampling period and sampling interval may be used if desired. Preferably, however, the ratio of sampling period to sampling interval is maintained at less than one percent, and the preferred value is one-half of one percent.

The open circuit voltage of the photovoltaic array is required continuously for use by the comparator. Suitably, the open circuit voltage may be maintained during the sampling intervals between sampling periods by any of the known sample and hold techniques of either the analog or digital types. Preferably, however, the open circuit voltage of the photovoltaic array is stored as a charge within a capacitor, the capacitor being charged to the open circuit reference voltage from the photovoltaic array through a blocking diode during the sampling period. The blocking diode minimises loss of charge in the capacitor to the photovoltaic array when the output voltage of the photovoltaic array falls while current is flowing from it. Suitably, a resistor is placed in parallel with the capacitor, whereby the voltage stored on the capacitor may fall gradually with time to permit the voltage stored on the capacitor to follow a reduction in the open circuit reference voltage of the photovoltaic array.

The comparator may provide an indication of the relative values between the open circuit voltage and the array output voltage and may control the regulation means to maintain the array output voltage at the desired fraction.

The regulation means may be operated to regulate the power transfer from the array to maintain the output voltage of the array at a selected fraction of the indicated open circuit voltage. Preferably, the selected fraction is maintained at a constant value which may, if desired, be within the range of between 0.75 and 0.80. This fraction has found to provide a condition close to the maximum power output of the photovoltaic array for any level of insolation.

The switching power converter may be also have its operating characteristics controlled by feedback from the input or output of the switching power converter, whereby the output of the power conversion apparatus may be controlled to maintain selected voltage or current charactistics, such as a constant output voltage for purposes such as maintaining a battery float voltage level after a battery has been fully charged.

In a further aspect, this invention resides in a method of transferring power from a photovoltaic array to a load including:
maintaining the output voltage from said photovoltaic array at a voltage between 0.75 and 0.80 of the open circuit voltage of said photovoltaic array; and
feeding said power from said photovoltaic array to said load.

In yet another aspect, this invention resides in a method of constructing electronic switching apparatus including:
using a length of hollow extruded aluminium alloy box section as a heat sink;
placing a switching semiconductor on a side of said box section at a lower end;
placing a further switching semiconductor on the opposite face of said side and adjacent said switching semiconductor;
attaching said switching semiconductor and said further switching semiconductor to said box section by means of a common fastener passing through an aperture in said box section, said fastener connecting said switching semiconductor and said further switching semiconductor, and clamping said switching semiconductor and said further switching semiconductor to said box section, whereby heat transfer between said switching semiconductor and said box section is enhanced; mounting further electronic components on a printed circuit board;
attaching the leads of said semiconductor and said further switching semiconductor to a printed circuit board adjacent one another, whereby inductive effects in the conductive path between said semiconductor and said further switching semiconductor are minimised, and whereby an end of said box section is brought adjacent said printed circuit board; placing encapsulating material within said box section.

In order that this invention may be more easily understood and put into practical effect, reference will now be made to the accompanying drawings which illustrate preferred embodiments of the invention, wherein:

BRIEF DESCRIPTION OF THE DRAWINGS

FIG. 3 is a block diagram of an alternative power conversion apparatus, and

FIG. 4 is a pictorial view of electrical switching apparatus.

DESCRIPTION OF THE PREFERRED EMBODIMENTS

Figure 1:
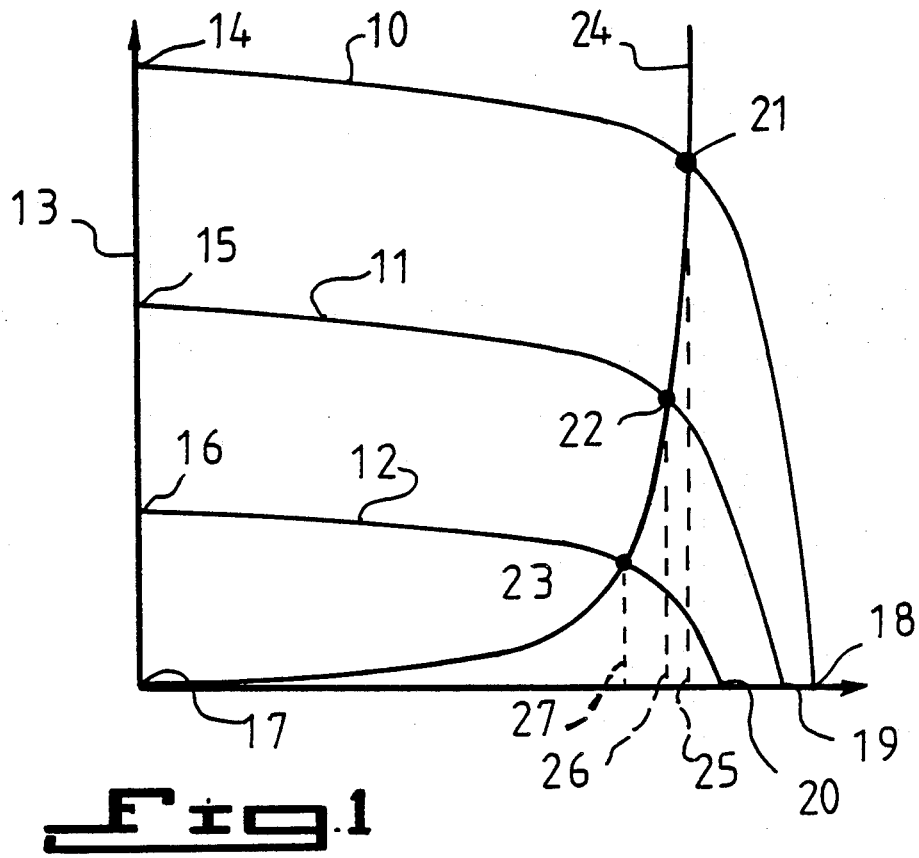
FIG. 1 is a graph of typical voltage-current characteristics for a photovoltaic array.

FIG. 1 shows a set of voltage-current curves 10, 11 and 12 for various values of solar insolation at particular temperatures. The voltage-current curves 10, 11 and 12 intersect the current axis 13 at short-circuit current points 14, 15 and 16 respectively, and these points show the values of short-circuit current which are obtainable from a photovoltaic array at the prevailing conditions. The voltage-current curves 10, 11 and 12 also intersect the voltage axis 17, the intersections being the open-circuit voltage points 18, 19 and 20 respectively, and these points show the values of open circuit voltage which are obtainable from a photovoltaic array at the prevailing conditions.

Maximum power points 21, 22 and 23 are the points on respective curves 10, 11 and 12 at which the product of voltage and current is a maximum. The locus of maximum power points 24 is a curve passing through the maximum power points for all voltage-current curves. To achieve the maximum possible power output from the photovoltaic array for a range of prevailing conditions, it is necessary to change the load on the photovoltaic array such that the current-voltage conditions of the photovoltaic array remain on the locus of maximum power points 24.

The projections from the maximum power points 21, 22 and 23 onto the voltage axis 17 produce the maximum power point voltages 25, 26 and 27. For the photovoltaic array to which FIG. 1 refers, the division of the maximum power point voltages 25, 26 and 27 by the respective open circuit voltages 18, 19 and 20 yields a constant of value 0.77.

Figure 2:
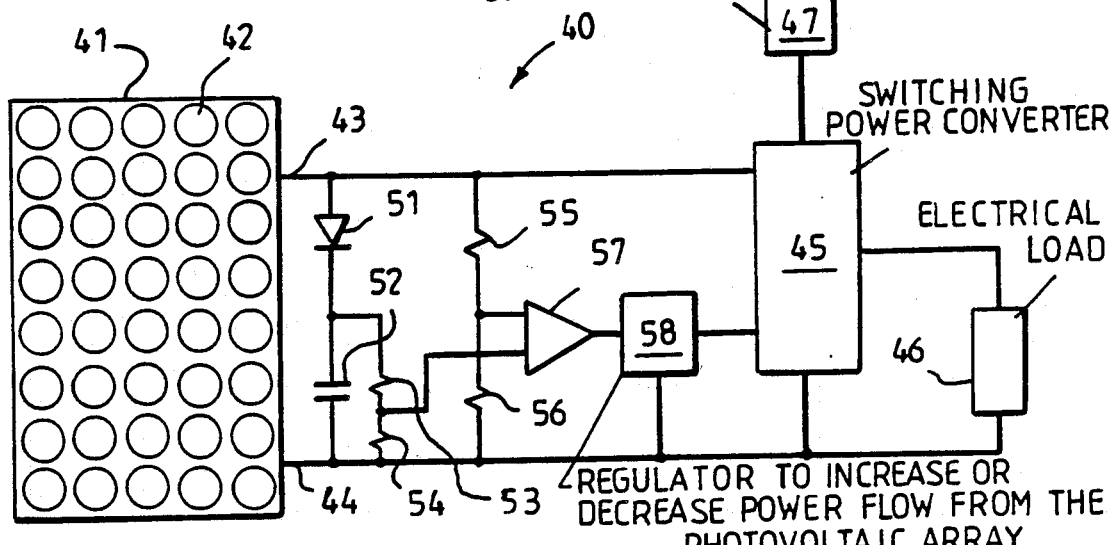
FIG. 2 is a block diagram of a power conversion apparatus.

The power converter apparatus 40 shown in FIG. 2 derives its power from a photovoltaic array 41 made up of photovoltaic cells 42. The positive terminal 43 and the negative terminal 44 of the photovoltaic array 41 are connected to the switching power converter 45, and the latter is, in turn, connected to a load 46.

An oscillator 47 is connected to an inhibiting control function on the switching power converter 45 and inhibits the operation of the switching power converter 45 for fifty milliseconds every ten seconds. A diode 51 has its anode connected to the positive terminal 43 of the photovoltaic array and its cathode connected to a capacitor 52. The other terminal of the capacitor 52 is connected to the negative terminal 44 of the photovoltaic array 41.

An upper resistor 53 and a lower resistor 54 form a resistive divider across the capacitor 52, and the junction between the resistors 53 and 54 is connected to one input of a comparator 57. The other input to the comparator 57 is connected to the common connection point of a resistive divider comprising a positive-rail resistor 55 and a negative-rail resistor 56.

The relative values of the resistors 53 and 54 and 55 and 56 are arranged such that the voltages applied to the inputs of the comparator 57 are equal when the voltage between the terminals 43 and 44 of the photovoltaic array 41 is seventyseven percent of the voltage across the capacitor 52. The output of the comparator 57 is connected to a regulator 58 which controls the switching power converter 45.

In use, electric power is produced by the photovoltaic array 41 and fed to the switching power converter 45, which converts the available power to a voltage and current appropriate to the resistance of the load 46.

Every ten seconds, the oscillator 47 inhibits the operation of the switching power supply 45 for fifty milliseconds. During this period, the current drawn from the photovoltaic array 41 falls to zero, and the voltage across the terminals 43 and 44 of the photovoltaic array 41 rises to the open circuit voltage of the photovoltaic array. Current flows through the diode 51 to charge the capacitor 52 to a voltage approaching the open circuit voltage of the photovoltaic array 41.

When the oscillator 47 ceases to inhibit the operation of the switching power supply, the voltage across the terminals 43 and 44 falls to its loaded value, and the diode 51 minimises flow of current away from the capacitor 52. The relative values of voltage between the terminals 43 and 44 and the voltage across the capacitor 52 are constantly compared by the comparator 57, and the output from the comparator 57 signals the regulator 58 to increase or decrease the power flow from the photovoltaic array 41 according to whether the operating voltage of the photovoltaic array 41 is less or more than seventy-seven percent of the open-circuit voltage of the photovoltaic array 41, as determined by the voltage across the capacitor 52.

The comparator 57 compares these voltages, and controls the regulator 58 to maintain the voltage across the terminals 43 and 44 at seventy-seven percent of the voltage across the capacitor 52.

The charge on the capacitor 52 gradually leaks away through the resistors 53 and 54, allowing the voltage across the capacitor 52 to fall gradually such that it may follow a fall in the open circuit voltage of the photovoltaic array.

As shown in FIG. 3, the power converter apparatus 60 derives its power from a photovoltaic power array 61 made up of photovoltaic cells 62. A separate reference array 63 made up of photovoltaic cells 62 is located in close proximity to the power array 61 such that it experiences similar insolation and temperature conditions to the power array 61.

The open-circuit voltage of the reference array 63 will, under these conditions, maintain direct proportionality with the open-circuit voltage of the power array 61. The positive terminal 64 and the negative terminal 65 of the power array 61 are connected to the switching power converter 66, and the latter is, in turn, connected to a load 67.

A comparator 68 has one of its input terminals connected to the centre point of a resistive divider comprising a positive-rail resistor 69 and a negative-rail resistor 70. The negative terminal of the reference array 63 is connected in common with the negative terminal 65 of the power array 61, while the positive terminal of the reference array 63 is connected to a resistive divider formed of an upper resistor 71 and a lower resistor 72. The junction of the resistors 71 and 72 is connected to the second input terminal of the comparator 68.

The relative values of the resistors 69 and 70 and 71 and 72 are arranged such that the voltage difference between the inputs to the comparator 68 is zero when the voltage across the power array 61 is seventy-seven percent of the voltage across the reference array 63 after allowing for the ratio of the respective open-circuit voltages of the arrays 61 and 63. The output of the comparator 68 controls a regulator 73, which in its turn, regulates the operation of the switching power converter 66.

In use, electric power is produced by the power array 61 and fed to the switching power converter 66, which converts the available power to a voltage and current appropriate to the resistance of the load 67.

The relative values of voltage between the terminals 64 and 65 and the voltage across the reference array 63 are constantly compared by the comparator 68, and the output from the comparator 68 signals the regulator 73 to increase or decrease the power flow from the power array 61 according to whether the operating voltage of the power array 61 is less or more than seventy-seven percent of the open-circuit voltage of the power array 61, as determined by the open-circuit voltage of the reference array 63.

The electrical switching apparatus 80 shown in FIG. 4 includes a first switching semiconductor 81 and a second switching semiconductor 82. The first switching semiconductor 81 is mounted on the inside face 83 of a heatsink 84, and the second switching semiconductor 82 is mounted on the outside face 85 of the heatsink 84 opposite the switching semiconductor 81.

The switching semiconductors 81 and 82 are electrically insulated from the heatsink 84 by thin sheets of mica insulation 86, and are clamped into contact with the heatsink 84 by means of a bolt 87 which passes through an aperture 88 in the heatsink 84, and which is insulated from the heatsink 84.

The connecting leads 89 from the base of the switching semiconductors 81 and 82 pass through lead apertures in the printed circuit board 90 and are soldered to conductive tracks on the underside of the printed circuit board 90. Encapsulating material 91 is placed within the enclosure formed by the heat sink and the printed circuit board.

It will of course be realised that while the above has been given by way of illustrative example of this invention, all such and other modifications and variations thereto as would be apparent to persons skilled in the art are deemed to fall within the broad scope and ambit of this invention as is defined in the appended claims.

What is claimed is:

1. Power transfer control apparatus for optimizing the power output from a photovoltaic array having a variable open circuit voltage, said control apparatus comprising:

monitoring means for providing a sample voltage which is a linear proportion of the open circuit voltage of said photovoltaic array:

voltage scaling means for reducing the sample voltage by a constant fraction to yield a reference voltage between 0.75 and 0.8 of the sample voltage:

array voltage detection means for providing a scaled array voltage which is the same proportion of the output voltage of said photovoltaic array under load as the sample voltage is of the open circuit voltage:

a comparator connected to said voltage scaling means and to said array voltage detection means, said comparator being capable of comparing said reference voltage with the scaled array voltage; and, regulation means responsive to said comparator wherein said comparator and said regulation means comprise a feedback control loop for regulating the output voltage of the photovoltaic array under load to said constant fraction of the open circuit voltage of the photovoltaic array.

2. The power transfer control apparatus according to claim 1, wherein said constant fraction is 0.77.

3. The power transfer control apparatus according to claim 2, wherein said comparator has input voltage ranges which are less than said reference voltage and said array voltage, and wherein each of said reference voltage and said array voltage are varied by the same linear proportion to match the input requirements of said comparator.

4. The power transfer control apparatus according to claim 3, wherein said monitoring means includes an open circuited photovoltaic cell disposed in the same environment as the photovoltaic array, the photovoltaic cell being selected to have a variable open circuit voltage of a known linear proportion of the variable open circuit voltage of the photovoltaic array.

5. The power transfer control apparatus according to claim 3, wherein said monitoring means includes a capacitor arranged to be charged to said sample voltage, there being provided interrupting means for interrupting the current flow to the load from said photovoltaic array so that said capacitor is capable of being charged at a voltage proportional to the open circuit voltage of the photovoltaic array.

6. The power transfer control apparatus according to claim 5, wherein said interrupting means interrupts said current flow for a sampling period which is of a less duration when compared to the interval between successive sampling periods.

7. The power transfer control apparatus according to claim 6, wherein said sampling period is less than one percent of said interval.

8. Power transfer control apparatus for optimizing the power output from a photovoltaic array having a variable open circuit voltage, said control apparatus comprising:

monitoring means for providing a sample voltage which is a linear proportion of the open circuit voltage of said photovoltaic array;

voltage scaling means for reducing the sample voltage by a constant fraction;

array voltage detection means for providing a scaled array voltage which is the same proportion of the output voltage of said photovoltaic array under load as the sample voltage is of the open circuit voltage;

a comparator connected to said voltage scaling means and to said array voltage detection means, said comparator being capable of comparing said reference voltage with the scaled array voltage; and, regulation means responsive to said comparator wherein said comparator and said regulation means comprise a feedback control loop for regulating the output voltage of the photovoltaic array under load to a voltage between 0.75 and 0.8 of the open circuit voltage of the photovoltaic array.

* * * * *